United States Patent [19]

Oshima et al.

[11] Patent Number: 5,242,982
[45] Date of Patent: Sep. 7, 1993

[54] CORE-SHELL POLYMER COMPOSITION CONTAINING THE POLYMERS AND ITS MOLDED ARTICLES

[75] Inventors: Junji Oshima, Toyonaka; Tatsuo Fujii, Nagaokakyo; Minoru Yamada, Kawanishi, all of Japan

[73] Assignee: Takeda Chemical Industries, Ltd., Osaka, Japan

[21] Appl. No.: 915,396

[22] Filed: Jul. 20, 1992

Related U.S. Application Data

[60] Continuation of Ser. No. 644,731, Jan. 17, 1991, abandoned, which is a division of Ser. No. 418,632, Oct. 10, 1989, Pat. No. 5,006,592.

[30] Foreign Application Priority Data

Oct. 7, 1988 [JP] Japan .................................. 63-254553

[51] Int. Cl.$^5$ ............................................. C08F 269/00
[52] U.S. Cl. ................................... 525/286; 525/308; 525/902
[58] Field of Search ........................ 525/286, 308, 902

[56] References Cited

FOREIGN PATENT DOCUMENTS 49-20628  5/1974  Japan .................................. 525/902

Primary Examiner—Joseph L. Schofer
Assistant Examiner—R. H. Delmendo
Attorney, Agent, or Firm—Wenderoth, Lind & Ponack

[57] ABSTRACT

This invention relates to a core-shell polymer comprising (a) a core having epoxy groups on the surface and (b) a shell on the core (a) having neither epoxy group nor functional groups that are reactive with epoxy group, compositions of engineering plastics which are excellent in impact strength at low temperature and the molded articles of the resin composition.

1 Claim, No Drawings

CORE-SHELL POLYMER COMPOSITION CONTAINING THE POLYMERS AND ITS MOLDED ARTICLES This application is a continuation of now abandoned application, Ser. No. 07/644,731 filed on Jan. 17, 1992, which in turn is a divisional of U.S. application Ser. No. 07/418,632, filed Oct. 10, 1989 now U.S. Pat. No. 5,006,592.

This invention relates to a core-shell polymer for engineering plastics and a resin composition showing remarkably improved impact strength at low temperature, produced by meltblending of the core-shell polymers.

BACKGROUND OF THE INVENTION

Moldings of poly(alkylene terephthalate) resins such as poly(butylene terephthalate) (PBT) and poly(ethylene terephthalate) (PET) and polyamide resins such as nylon 6 and nylon 66 are insufficient in their impact strength, and many attempts have been made to improve the impact strength. Many agents have been proposed to improve the impact strength which are to be added to resins and subjected to melt-blending. Among the agents proposed so far, a core-shell polymer comprising a core made of rubbery polymer and a shell, around the core, made of glassy polymer is an excellent agent for improvement of impact strength as far as attaining high impact strength, because its reproducibility is high, since its dispersion into resin is hardly affected by the conditions of melt-blending.

A multiphase polymer of which the outermost phase has epoxy groups has been proposed in Japanese Patent Application Laid-Open No. 74652/77 as a core-shell polymer for improvement of the impact strength of poly(alkylene terephthalate) resins. However it is not practicable because it can improve the impact strength only slightly after melt-blending with a poly(alkylene terephthalate) resin, and practically a considerable proportion of the epoxy groups included therein have been lost during the processes of polymerization and drying. Japanese Patent Application Laid-Open No. 150466/77 has proposed compositions of core-shell polymers having no epoxy groups with poly(alkylene terephthalate) resins; some of these compositions of which have shown high notched Izod impact strength (thickness: ⅛ inch) at 25° C. or higher. However even these compositions with high impact strength show a change from ductile fracture to brittle fracture (i.e. a ductile-brittle transition) at about 20° C., below which they show only a low notched Izod impact strength.

As core-shell polymers which can improve the impact strength of polyamide resins, Japanese Patent Application Laid-Open No. 6284/72 has proposed compositions of core-shell polymers of which the outermost phase contains carboxyl groups, with polyamide resins; some of these compositions of which have shown high notched Izod impact strength (thickness: ⅛ inch) above 23° C. However even these compositions with high impact strength exhibited ductile-brittle transitions at about 15° C., below that which they exhibited only low Izod impact strength.

On the other hand, engineering plastics, such as poly(alkylene terephthalate) resins, polyamide resins, modified poly(phenylene oxide) resins, polyacetal resins, and polycarbonate resins, require sufficiently high impact strength in the range of from room temperature to −30° C. when they are to be used for the outer-parts of cars. However as described above, the prior art had a problem in that poly(alkylene terephthalate) resin compositions and polyamide resin compositions produced by melt-blending impact modifiers of the core-shell polymer show ductile-brittle transitions at room temperature (15° to 25° C.) in the notched Izod impact test (thickness: ⅛ inch), having only low Izod impact strength below room temperature.

DETAILED DESCRIPTION OF THE INVENTION

As the result of the researches of the inventors on impact modifiers of the core-shell polymer for production of poly(alkylene terephthalate) resin compositions, polyamide resin compositions, and compositions of other engineering plastics which are excellent in impact strength at low temperature, the inventors unexpectedly found that melt-blending of the core-shell polymers composed as follows can solve the problems described above, and have completed this invention. Namely, this invention relates to a core-shell polymer comprising (a) a core having epoxy groups on the surface and (b) a shell on the cores (a) having neither epoxy group nor functional groups that are reactive with epoxy groups, compositions of engineering plastics which are excellent in impact strength at low temperature and the molded articles of the resin compositions.

The impact modifiers of the core-shell polymer in this invention can be obtained by consecutive multistage seed emulsion polymerization in which successive stages proceed so that the polymer in a stage may be covered with the polymer in the next stage.

A core in this invention means a rubbery polymer or a rubbery polymer covered with an outer phase, and has epoxy groups at least on the surface.

When a core composed only of a rubbery polymer is used for the production of the core-shell polymer in this invention, at least two stages of emulsion polymerization are required.

The first polymerization stage is for the formation of rubbery polymers as the core and the second polymerization stage is for the formation of shells.

The polymerization in the first stage consists in the polymerization of a conjugated diene, or an alkyl acrylate of which the alkyl group has 2 to 8 carbon atoms, or a mixture thereof, with a monomer containing epoxy group (abbreviated "a epoxy-monomer" hereinafter) to form rubbery polymers. The glass transition temperature of the rubbery polymer is −30° C. or lower.

When the glass transition temperature of the rubbery polymer is higher than −30° C. improvement in the impact strength at low temperatures may be insufficient in some cases.

Such conjugated dienes include butadiene, isoprene, and chloroprene, among which butadiene is desirably used.

Alkyl acrylates of which the alkyl group has 2 to 8 carbon atoms include ethyl acrylate, propyl acrylate, butyl acrylate, cyclohexyl acrylate, and 2-ethylhexyl acrylate, among which butyl acrylate is desirably used.

For the polymerization in the first stage, monomers which can be copolymerized with conjugated dienes and alkyl acrylates may be used, being exemplified by aromatic vinyls and aromatic vinylidenes such as styrene, vinyltoluene, and α-methylstyrene, vinyl cyanides and vinylidene cyanides such as acrylonitrile and methacrylonitrile, alkyl methacrylates such as methyl methacrylate, and butyl methacrylate.

Epoxy-monomers include glycidyl acrylate, glycidyl methacrylate, 4,5-epoxypentyl acrylate, 4,5-epoxypentyl methacrylate, allyl glycidyl ether, and butadiene monoepoxide, among which glycidyl acrylate and glycidyl methacrylate are desirably used.

The amount of the epoxy-monomer accounts for 0.1 to 40 weight % of the core phase, preferably 0.1 to 10 weight %.

It is desirable that the polymerization generates a concentration gradient with respect to the epoxy-monomer with the highest concentration in the vicinity of the shell, because such polymerization can utilize a smaller amount of epoxy-monomer effectively.

When no conjugated diene is included in the polymerization in the first stage, or when the conjugated diene in the polymerization in the first stage accounts for 20 weight % or less per the total amount of the monomer of the rubbery polymer, use of a small amount of a crosslinking monomer and/or a graft monomer can achieve higher impact strength at lower temperatures.

The crosslinking monomers include aromatic divinyl monomers such as divinyl benzene, alkane polyol polyacrylates or alkane polyol polymethacrylates such as ethylene glycol diacrylate, ethylene glycol dimethacrylate, butylene glycol diacrylate, hexanediol diacrylate, hexanediol dimethacrylate, oligoethylene glycol diacrylate, oligoethylene glycol dimethacrylate, trimethylol propane diacrylate, trimethylol propane dimethacrylate, trimethylol propane triacrylate, and trimethylol propane trimethacrylate, among which butylene glycol diacrylate and hexanediol diacrylate are desirably used.

The graft monomers include unsaturated carboxylic acid allyl esters such as allyl acrylate, allyl methacrylate, diallyl maleate, diallyl fumarate, and diallyl itaconate, among which allyl methacrylate is desirably used.

Each of these crosslinking monomers and graft monomers accounts for 0.01 to 5 weight % of the total amount of the monomers constituting a rubbery polymer, preferably 0.1 to 2 weight %.

It is desirable that the core accounts usually for 50 to 95 weight % of the whole core-shell polymer.

When the amount of the core is smaller or larger than the range, the resin compositions produced by melt-blending with the core-shell polymer may show only insufficient improvement in the impact strength in some cases.

The polymerization in the second stage forming the so-called shell by polymerization of the monomers containing neither epoxy group nor functional groups that are reactive with epoxy groups into glassy polymer. The glass transition temperature of the glassy polymer is 40° C. or higher.

When the glass transition temperature of the shell is lower than 40° C., handling during the processes from dehydration-drying to melt-blending of the core-shell polymer to produce the resin may become extremely difficult due to the tackiness, and thus such shell is of no practical use. The glass transition temperature is preferably 60° C. or higher.

Functional groups reactive with epoxy group include many polar groups such as amino groups, imino groups, carboxyl groups, carboxylate groups, hydroxyl groups, isocyanate groups, sulfonic acid groups, and sulfonate groups.

Monomers having neither epoxy groups nor functional groups reactive with epoxy groups as described above are used for formation of the shell.

The monomers include alkyl acrylates such as ethyl acrylate and butyl acrylate, alkyl methacrylates such as methyl methacrylate and butyl methacrylate, aromatic vinyls and aromatic vinylidenes such as styrene, vinyl toluene, and α-methylstyrene, vinyl cyanides and vinylidene cyanides such as acrylonitrile and methacrylonitrile, vinyl-polymerizable monomers among which methyl methacrylate, styrene, and acrylonitrile are preferably used.

It is desirable that the shell accounts for 5 to 50 weight % of the whole core-shell polymer.

When the proportion of the shell is smaller or larger than the above range, the resin compositions produced by melt-blending of the core-shell polymer may show only insufficient improvement in the impact strength in some cases. In this invention the core may comprise a phase of rubbery polymer and an additional outer phase.

For production of a core-shell polymer with such a core, at least three stages of an emulsion polymerization are required.

The polymerization in the first stage is for formation of a rubbery polymer, polymerization in the second stage is for formation of a phase containing an epoxy group outside the rubbery polymer, and polymerization in the third stage is for formation of shell.

The polymerization in the first stage consists in formation of rubbery polymer, by polymerization of a conjugated diene, or an alkyl acrylate of which the alkyl group has 2 to 8 carbon atoms, or a mixture thereof. The glass transition temperature of the rubbery polymer is −30° C. or lower for the same reason as described above.

The conjugated dienes and alkyl acrylates of which the alkyl group has 2 to 8 carbon atoms as used in this stage are those described above.

Also, monomers which can copolymerize with conjugated dienes or alkyl acrylates, crosslinking monomers, and graft monomers are those as described above.

The polymerization in the second stage is formation of the phase outside of the rubbery polymer using an epoxy-monomer.

Epoxy-monomers are those described above. The epoxy-monomers may be used as they are or copolymerized with other monomers.

The other monomers for copolymerization include those for vinyl polymerization containing no functional groups reactive with epoxy groups, exemplified by alkyl acrylates such as ethyl acrylate and butyl acrylate, alkyl methacrylates such as methyl methacrylate and butyl methacrylate, aromatic vinyls and vinylidenes such as styrene, vinyl toluene, and α-methyl styrene, and vinyl cyanides and vinylidene cyanides such as acrylonitrile and methacrylonitrile, among which ethyl acrylate, butyl acrylate, and methyl methacrylate are desirably used.

It is desirable that the epoxy-monomer in this phase accounts for 5 to 100 weight %, preferably 20 to 100 weight %. The amount of the epoxy-monomers accounts for 0.1 to 40 weight % of the core, preferably 0.1 to 10 weight %.

The proportions between the rubbery polymer and the phase containing an epoxy group is selected according to the monomers used. Preferably the phase containing an epoxy group accounts for 0.1 to 40 weight % of the core. More preferably the phase accounts for 0.1 to 10 weight % when the phase consists of only epoxy-monomers.

When the amount of the epoxy-monomer is smaller or larger than the above range, the resin composition obtained by melt-blending of the core-shell polymer may be insufficient in improve of the impact strength in some cases.

A single phase or two or more intermediate phases can be present between the rubbery polymer of which the glass transition temperature is $-30°$ C. or lower and the phase described above, and the presence of such an intermediate phase may reduce the strain of the core-shell at low temperatures so as to improve the impact strength at low temperatures.

When the so-called core composed of multiple phases is made, it is desirable for the same reasons as described above that also the core amount to 50 to 95 weight % of the whole core-shell polymer.

The polymerization in the third stage is to form the shell by the polymerization of monomers containing neither epoxy groups nor functional groups reactive with epoxy groups into a glassy polymer. The glass transition temperature of the glassy polymer is 40° C. or higher.

When the glass transition temperature of the shell is lower than 40° C., handling during the steps from the dehydration-drying to the melt-blending of the core-shell polymer to produce the resin composition may become extremely difficult due to the tackiness, and thus such a shell is of no practical use. The glass transition temperature is preferably 60° C. or higher.

The monomers containing neither epoxy groups nor functional groups reactive with epoxy group are those described above.

It is desirable from the same reasons as described above that also the shell accounts for 5 to 50 weight % of the whole core-shell polymer.

The core-shell polymer in this invention can be obtained in the form of granules, flakes or powders, by freeze-thaw or salting-out of the latex produced by the known seed emulsion polymerization for separation of the polymer, followed by centrifugal dehydration and drying.

Spray drying with a spray drier can separate the core-shell polymer directly from the latex.

The core-shell polymer thus separated may be molded into pellets with an extruder and a pelletizer, or may be subjected immediately to melt-blending as an impact modifier to make a resin composition.

The engineering plastics may be those usually used, such as polyamide resins, polyalkylene terephthalate resins, modified polyphenylene oxide resins, polyacetal resins, and polycarbonate resins, among which those containing functional groups reactive with epoxy groups are desirable.

The polyalkylene terephthalate resins as the engineering plastics used for this invention include PET, polypropylene terephthalate, and PBT, among which PBT is desirable.

Many kinds of polyalkylene terephthalate resins are commercially sold. The core-shell polymer can be applied for any polyalkylene terephthalate resins as far as the resins are used for molding articles.

Polyalkylene terephthalate resins are also frequently used in the form of polymer alloys by melt-blending with other plastics, such as polycarbonate resin and modified polyphenylene oxide resin, and the use of the core-shell polymer of this invention for the melt-blending can achieve high impact strength at lower temperature. Also the melt-blending of the core-shell polymer with a polymer alloy containing a polyalkylene terephthalate resin is, of course, included in this invention.

Melt-blending of the core-shell polymer of this invention with a polyamide resin, a modified polyphenylene oxide resin, a polyacetal resin, or a polycarbonate resin may bring about marked improvement in the impact strength.

Polyamide resins, modified polyphenylene oxide resins, polyacetal resins, and polycarbonate resins are used often in the form of a polymer alloy prepared by melt-blending with each other or with other plastics such as an ABS resin, and in this case, melt-blending of the core-shell polymer of this invention can achieve high impact strength.

In this invention, the composition comprises a core-shell polymer of 2 to 50 weight % based upon the composition, preferably 5 to 35 weight %.

When the amount of the core-shell polymer is lower than 2 weight %, the molded articles, which contain the core-shell polymer, may not show the high impact strength. When the amount is higher than 50 weight %, the articles may not have rigidity and/or heat-resistance.

The engineering plastic resin compositions of this invention are produced by melt-blending. The temperature for the melt-blending is appropriately chosen usually in the range from 200° to 300° C. so that the resin may be melted and at the same time the viscosity may be not very low. The temperature for PBT, as an example, is 230° to 260° C. Melt-blending can be carried out with the aid of a heating roll, a Banbury mixer, or a single-screw or multi-screw extruder.

The resin compositions of this invention may contain appropriate amounts of additives. Such additives include fire retardants, mold release agents, weatherability-improving agents, antioxidants, antistatic agents, heat resistance-improving agents, coloring agents, reinforcements, surfactants, inorganic fillers, and lubricants.

Especially, the use of antioxidants is preferable. In this case the obtained articles have extreme heat-resistance.

The antioxidants include phenol compounds such as butylated hydroxytoluene, n-octadecyl-3-(3',5'-di-tert-butyl, 4'-hydroxyphenyl) propionate, tocophelol, 2,2'-methylene bis (4-methyl-6-tert-butylphenol), 1,3,5-trimethyl-2,4,6-tris (3,5-di-tert-butyl-4-hydroxybenzyl) benzen, tetrakis [methylene-3-(3',5'-di-tert-butyl-4'-hydroxy-phenyl) propionate] methane, etc., phosphate compounds such as tris (mixed, mono/di-nonylphenyl) phosphate, di-stearyl pentaerysritol diphosphate, tris (2,4-di-t-butylphenyl) phosphate, 4,4'-butylidene bus (3-methyl-6-t-butylphenyl) di-tridecylphosphate, etc., sulfate compounds such as dilaulyl-3,3'-thiopropionic acid ester, distearyl-3,3'-thiopropionic acid ester, etc.

The antioxidants may be added into the latex stage of the core-shell polymer and may also added the same time as the core-shell polymers are melt-blended with the engineering plastics to obtain the resin composition.

The added antioxidants accounts for 0.01 to 10 parts by weight per 100 parts of the resin composition, preferably 0.1 to 2 parts by weight.

The composition obtained as described above is molded by an usual molding method to get the desirable molded articles. The method is, for example, an injection molding, a extrusion molding, a press molding, etc. at a temperature range of 200° to 300° C.

The obtained articles may be applied for parts of a car such as a bumper, a fender, a door-handle, etc., an apparatus for automation of an office, household electric appliances, etc.

The engineering plastics melt-blended with the core-shell polymers of this invention show high impact strength at low temperatures ranging from room temperature (15° to 25° C.) to −30° C., which has not been experienced with the conventional core-shell polymers.

Preferably poly(alkylene terephthalate) melt-blended with core-shell polymers has high impact strength.

The engineering plastic resin compositions of this invention shown excellent impact strength at low temperature because they have low ductile-brittle transition temperature, and, in addition, they have high notched Izod impact strength under the brittle fracture region.

The molded articles, which are obtained from the resin composition comprising antioxidants, show higher heat-resistance.

EXAMPLES

The following working examples and comparative examples will illustrate this invention in more detail, but the invention should not be limited by these examples. The "parts" described in the working examples and the comparative examples mean parts by weight. The following abbreviations are used in the working examples and the comparative examples.

| | |
|---|---|
| butadiene | Bd |
| ethyl acrylate | EA |
| n-butyl acrylate | BA |
| 2-ethylhexyl acrylate | 2EHA |
| methyl methacrylate | MMA |
| styrene | St |
| glycidyl methacrylate | GMA |
| allyl methacrylate | AlMA |
| allyl maleate | AlMl |
| 1,4-butylene glycol diacrylate | BGA |
| 1,6-hexanediol diacrylate | HGA |
| deionized water | DIW |
| sodium dioctylsulfosuccinate | SSS |
| sodium dodecylbiphenylethersulfonate | DBES |
| sodium persulfate | SPS |
| cumene hydroperoxide | CHP |
| sodium formaldehyde sulfoxylate | SFS |
| sodium ethylenediamine tetraacetate | EDTA |
| sodium hydrogencarbonate | SHC |
| polyoxyphenylene nonylphenyleter | NPEa |
| 2,2'-azo bis (methyl isobutylate) | AMI |
| polybutylene terephthalate | PBT |
| glass transition temperature | Tg |

The glass transition temperature is defined as the peak temperature at tan δ in measurement of dynamic viscoelasticity (measured by the Type VEF-3 manufactured by Iwamoto Seisakusho Co., Ltd.) by the tensile mode at 10 Hz.

The weight average particle size of a core-shell polymer was determined by a Coulter Model N-4 manufactured by Coulter Electronics, Inc.

WORKING EXAMPLE 1

Production of a core-shell polymer A

Into a 2-polymerization vessel equipped with a reflux condenser, 540 g of DIW, 18.4 g of 1% aqueous SSS solution, and 36 g of 1% aqueous SHC solution were placed and heated up to 70° C. by stirring under a stream of nitrogen gas. Then 36 g of the monomer mixture for the first stage of the following composition was added and allowed to disperse over 10 minutes, followed by addition of 76.5 g of 2% aqueous SPS solution to initiate seed polymerization.

| monomer for the first stage | |
|---|---|
| BA | 762 g |
| AlMA | 1.5 g |
| BGA | 1.5 g |

Then a monomer emulsion comprising the remaining 729 g of the monomer mixture for the first stage, 257 g of 1% aqueous SSS solution, 40.5 g of 1% aqueous SHC solution, and 27 g of DIW was fed continuously over 3 hours. After heating up to 80° C. and maturing for 1 hour, the mixture was cooled to 70° C. to initiate polymerization of the second stage. After addition of 13.5 g of 2% aqueous SPS solution, 206.1 g of the monomer emulsion for the second stage of the following composition was fed over 30 minutes.

| monomer emulsion for the second stage | |
|---|---|
| MMA | 94.5 g |
| EA | 13.5 g |
| GMA | 27.0 g |
| 1% aqueous SSS solution | 48.6 g |
| 1% aqueous SHC solution | 13.5 g |
| DIW | 9.0 g |

After maturing at 70° C. for 1 hour under the condition, 9.0 g of 2% aqueous SPS solution was added, and 148.5 g of the monomer emulsion for the third stage of the following composition was fed over 30 minutes.

| monomer emulsion for the third stage | |
|---|---|
| MMA | 90.0 g |
| 1% aqueous SSS solution | 31.5 g |
| 1% aqueous SHC solution | 9.0 g |
| DIW | 18.0 g |

After cooling and filtration through a 300 mesh stainless steel wire net, core-shell polymer latex of weight average particle size of 290 nm was obtained which contained 46.4% of solid substance. The latex was coagulated by freeze-thawing, and after washing, dehydration, and drying, core-shell polymer A was obtained.

WORKING EXAMPLES 2 TO 5

Production of a core-shell polymer B-E

According to the method of Working Example 1, the mixtures of the compositions listed in Table 1 were subjected to emulsion polymerization, freeze-thawing, washing with water, dehydration, and drying, to give core-shell polymers B, C, D, and E.

EXAMPLE 6

Production of a core-shell polymer F

In a 5 l-autoclave, 540 g of DIW and 2.4 g of DBES were placed and heated up to 50° C. by stirring under a stream of nitrogen gas. 7.5 g of St and 19.5 g of Bd were added, to which 1.1 g of an activating solution composed of 0.24 g of CHP and 5.0 g of SFS/0.5 g of EDTA/0.05 g of ferrous sulfate/50 g of DIW was added to initiate seed polymerization. After completion of the reaction, 1,000 g of DIW was added, to which 2,024 g of the monomer emulsion of the following composition, 2.4 g of CHP, and 11 g of the activating solution described above were fed continuously over 5, 8, and 8 hours, respectively, for the polymerization in the first stage.

| Monomer emulsion for the first stage | |
|---|---|
| St | 375 g |
| Bd | 1,125 g |
| DBES | 24 g |
| DIW | 500 g |

The reaction mixture was heated up to 70° C. to initiate polymerization in the second stage. 54 g of 2% aqueous SPS solution was added, to which 412 g of the monomer emulsion for the second stage of the following composition was fed over 30 minutes.

| Monomer emulsion for the second stage | |
|---|---|
| MMA | 189 g |
| EA | 27 g |
| GMA | 54 g |
| DBES | 1 g |
| 1% aqueous SHC solution | 27 g |
| DIW | 114 g |

After maturing at 70° C. for 1 hour under the condition, 18 g of 2% aqueous SPS solution was added, to which 297 g of the monomer emulsion for the third stage of the following composition was fed over 30 minutes.

| Monomer emulsion for the third stage | |
|---|---|
| MMA | 180 g |
| DBES | 1 g |
| 1% aqueous SHC solution | 18 g |
| DIW | 98 g |

After maturing at 70° C. for 1 hour, the mixture was cooled and filtrated through a 300 mesh stainless steel wire net, to give a core-shell polymer latex of weight average particle size of 240 nm which contained 46.5% of solid substance. The latex was coagulated by freeze-thawing and the coagulate was then washed with water, dehydrated, and dried, to give the core-shell polymer F.

WORKING EXAMPLE 7

Production of a core-shell polymer G

Into a 2 1-polymerization vessel equipped with a reflux condenser, 520 g of DIW, 20 g of 1% aqueous SSS solution, and 40 g of 1% aqueous SHC solution were placed and heated up to 70° C. by stirring under a stream of nitrogen gas. Then 40 g of the monomer mixture for the first stage (a) of the following composition was added and allowed to disperse over 10 minutes, followed by addition of 70 g of 2% aqueous SPS solution to initiate seed polymerization.

| monomer for the first stage (a) | |
|---|---|
| BA | 697.2 g |
| AlMA | 1.4 g |
| BGA | 1.4 g |
| monomer emulsion for the first stage (A) | |
| monomer for the first stage (a) | 660 g |
| SSS 1% | 230 g |
| SHC 1% | 30 g |
| monomer emulsion for the first stage (B) | |
| monomer for the first stage (b) | |
| BA | 119.4 g |
| GMA | 30 g |
| AIMA | 0.3 g |
| BGA | 0.3 g |
| SSS 1% | 54 g |
| SHC 1% | 15 g |
| DIW | 10 g |

Then 920 g of the monomer emulsion for the first stage (A) was fed continuously over 150 minutes, to which 15 g of SPS 2% was added immediately, and then 229 g of the monomer emulsion for the first stage (B) was fed over 30 minutes. After maturing at 70° C. for 1 hour, the mixture was subjected to the polymerization in the second stage. After addition of 15 g of SPS 2%, 244 g of the monomer emulsion for the second stage of the following composition was fed over 40 minutes, followed by maturing at 70° C. for one hour.

| monomer emulsion for the second stage | |
|---|---|
| monomer for the second stage | |
| MMA | 135 g |
| EA | 15 g |
| 1% aqueous SSS solution | 54 g |
| 1% aqueous SHC solution | 15 g |
| DIW | 10 g |

After cooling to the room temperature, the mixture was filtrated through a 300 mesh stainless steel wire net, to give a core-shell polymer latex of weight average particle size of 284 nm which contained 45.6% of solid substance. The latex was coagulated by freeze-thawing, and the coagulate was washed with water, dehydrated, and dried, to give the core-shell polymer G.

WORKING EXAMPLES 8 AND 9

Production of core-shell polymers H and I

The mixtures of the compositions listed in Table 1 were subjected to emulsion polymerization in the same manner as described in Working Example 7, followed by coagulation by freeze-thawing, washing with water, dehydration, and drying, to give the core-shell polymers H and I.

WORKING EXAMPLE 10

Production of a core-shell polymer J

In a 5 1-autoclave, 540 g of DIW and 2.4 g of DBES were placed and heated up to 50° C. stirring under a stream of nitrogen gas. 7.5 g of St and 19.5 g of Bd were added, to which 1.1 g of an activating solution composed of 0.24 g of CHP and 5.0 g of SFS/0.5 g of EDTA/0.05 g of ferrous sulfate/50 g of DIW was added to initiate seed polymerization. After completion of the reaction, 1,000 g of DIW was added, to which 2024 g of the monomer emulsion of the following composition, 2.4 g of CHP, and 11 g of the activating solution described above were fed continuously over 5, 8, and 8 hours, respectively, for the polymerization in the first stage.

| Monomer emulsion for the first stage | |
|---|---|
| St | 300 g |
| Bd | 1,050 g |
| GMA | 150 g |
| DBES | 24 g |

| -continued |  |
|---|---|
| Monomer emulsion for the first stage | |
| DIW | 500 g |

The reaction mixture was heated up to 70° C. initiate polymerization in the second stage. 54 g of 2% aqueous SPS solution was added, to which 631 g of the monomer emulsion for the second stage of the following composition was fed over 60 minutes.

| Monomer emulsion for the second stage | |
|---|---|
| MMA | 337.5 g |
| EA | 37.5 g |
| DBES | 1 g |
| 1% aqueous SHC solution | 54 g |
| DIW | 200 g |

After maturing at 70° C. 1 hour under the condition, the mixture was cooled to room temperature and filtrated through a 300 mesh stainless steel wire net, to give a core-shell polymer latex of weight average particle size of 240 nm which contained 46.5% of solid substance. The latex was coagulated by freeze-thawing and the coagulate was then washed with water, dehydrated, and dried, to give the core-shell polymer J.

WORKING EXAMPLE 11

Production of a PBT resin composition (1)

100 parts of PBT (PBT1401×04 manufactured by Toray Co., Ltd.) and 25 parts of the core-shell polymer A produced in Working Example 1 were dried until the water content became less than 0.3%, and subjected to melt-blending by using the twin-screw extruder PCM-30 manufactured by Ikegai Iron works, Ltd. at the cylinder head temperature of 245° C. and the die head temperature of 250° C. give pellets of the PBT resin composition (1).

According to JIS K-7210, Q value (flowability test of plastics) of this PBT was measured using Flow-tester CFT-500 (manufactured by Shimazu Co.) under conditions as follows.

| Conditions; | |
|---|---|
| temperature | 250° C. |
| load | 100 kgf |
| dye | a diameter is 1 mm |
|  | a length is 10 mm |

Q value of this PBT is 0.19 ml/s.

WORKING EXAMPLES 12 TO 22

Production of PBT resin compositions (2) to (10)

In place of the core-shell polymer A in Working Example 11, core-shell polymers B to J were used to produce pellets of PBT resin compositions (2) to (10).

COMPARATIVE EXAMPLES 1 AND 2

Production of core-shell polymers K and L

Core-shell polymers K and L having two phases of core-shell each, as listed in Table 1, were produced.

The outer most phase of the core-shell polymer K contained the epoxy group which is originated from GMA.

The core-shell polymer L is a polymer having two phases of core-shell which contains no epoxy group, and shows high notched Izod impact strength after melt-blending with PBT at room temperature or a higher temperature.

COMPARATIVE EXAMPLES 3 AND 4

Production of PBT resin compositions (11) and (12)

In place of the core-shell polymer A in Working Example 11, the core-shell polymers K and L were used to produce pellets of the PBT resin compositions (11) and (12).

EXPERIMENT 1

Test of the impact strength of the compositions (1) to (12)

Pellets of the PBT resin compositions (1) to (12), and PBT pellets were dried at 120° C. for 4 hours and molded by using the injection molding machine TS-100 manufactured by Nissei Plastic Industrial Co., Ltd. at the cylinder temperature of 250° C. and the nozzle temperature of 260° C., and 3.2 mm thick notched specimens for Izod impact test in accordance with the regulation of JIS K7113 were prepared. With these samples the impact strength at 30° C., 20° C., 10° C., 0° C., −10° C., and −30° C. was measured by a procedure in accordance with the JIS K7113. The results are summarized in Table 2.

WORKING EXAMPLES 21 TO 23

Production of core-shell polymers M, N and O

According to the method of Working Example 1, the mixtures of the compositions listed in Table 3 were subjected to emulsion polymerization, freeze-thawing, washing with water, dehydration, and drying, to give core-shell polymers M, N and O.

WORKING EXAMPLES 24 AND 25

Production of core-shell polymers P and Q

The mixture of 20 g of tetrakis [methylene-3-(3',5'-di-tert-butyl-4'-hydroxy-phenyl)propyonate] methane (Mark AO-60; manufactured by Adeca. Argas Co. Ltd., antioxidant agent), 20 g of toluene and 20 g of 1%DBES solution was subjected to emulsify to give an emulsion.

Latices (correspond to 1,000 g of solid substance) of core-shell polymers, which were obtained in Working Example 10 (core-shell polymer J) or 24 (core-shell polymer N), and the emulsion are mixed and stirred to obtain latex-latex blend.

The blened latices were coagulated by freeze-thawing, and after washing, dehydration, and drying, core-shell polymer P and Q were obtained.

WORKING EXAMPLES 26 TO 30

Production of PBT resin compositions (13) to (17)

In place of the core-shell polymer A in Working Example 11, core-shell polymers M to Q were used to produce pellets of PBT resin compositions (13) to (17).

WORKING EXAMPLE 31

Production of PBT resin composition (18)

In place of the core-shell polymer A and PBT in Working Example 11, core-shell polymer M, which was obtained in Working Example 21, and PBT (PBT1401×06, manufactured by Toray Co. Ltd.,) were used respectively to produce pellets of PBT resin composition (18).

The Q value of this PBT is 0.23 ml/s.

WORKING EXAMPLE 32

Production of a PBT resin composition (19)

In place of the core-shell polymer A and PBT in Working Example 11, core-shell polymer M, which was obtained in Working Example 21, and PBT (Juranex 2002, manufactured by Polyplastics Co. Ltd.,) were used respectively to produce pellets of PBT resin composition (19).

The Q value of this PBT is 0.36 ml/s.

COMPARATIVE EXAMPLE 5

Production of a PBT resin composition (20)

In place of the core-shell polymer A and PBT in Working Example 11, core-shell polymer L, which was obtained in Comparative Example 2, and PBT (PBT1401×06, manufactured by Toray Co. Ltd.,) were used respectively to produce pellets of PBT resin composition (20).

COMPARATIVE EXAMPLE 6

Production of a PBT resin composition (21)

In place of the core-shell polymer A and PBT in Working Example 11, core-shell polymer L, which was obtained in Comparative Example 2, and PBT (Juranex 2002, manufactured by Polyplastics Co. Ltd.,) were used respectively to produce pellets of PBT resin composition (21).

EXPERIMENT 2

Test of the impact strength of the compositions (13) to (21)

The impact strengths of pellets of the PBT resin compositions (13) to (21) were measured according to the same method of Experiment 1. The results are summarized in Table 4.

WORKING EXAMPLE 33

Production of a core-shell polymer R

Into a 5 liters-polymerization vessel equipped with a reflux condenser, 1,125 g of DIW and 135 g of 10% NPEa aqueous solution were placed and heated up to 70° C. by stirring under a stream of nitrogen gas.

Then 90 g of the monomer mixture for the first stage of the following composition, 45 g of 10% NPEa aqueous solution and 90 g of DIW were mixed thoroughly. The mixture was added and allowed to disperse over 10 minutes, followed by addition of 3.6 g of AMI to initiate seed polymerization.

| monomer for the first stage | |
|---|---|
| BA | 1,729.5 g |
| AIMA | 3.5 g |
| BGA | 3.5 g |

Then a monomer emulsion comprising the remaining 1,646.5 g of the monomer mixture for the first stage, 1,500 g of 10% NPEa aqueous solution, 525 g of DIW was fed continuously over 250 minutes.

After heating up to 90° C. and maturing for 1 hour, the mixture was cooled to 70° C. to initiate polymerization of the second stage.

After addition of 1.0 g of AMI, 267.5 g of the monomer emulsion for the second stage of the following composition was fed over 60 minutes.

| monomer emulsion for the second stage | |
|---|---|
| GMA | 67.5 g |
| 10% NPEa aqueous solution | 100 g |
| DIW | 100 g |

After maturing at 70° C. for 40 minutes, the polymerization for the third stage was carried out.

Then 1.5 g of AMI was added, and 1,012.6 g of the monomer emulsion for the third stage of the following composition was fed over 200 minutes.

| monomer emulsion for the third stage | |
|---|---|
| MMA | 303.8 g |
| EA | 33.8 g |
| 10% NPEa aqueous solution | 362.0 g |
| DIW | 313.0 g |

The reaction mixture was matured at 70° C. for 1 hour, and then, cooled down to room temperature.

After the cooling, the reaction mixture was filtrated through a 300 mesh stainless steel wire net to give core-shell polymer latex. The latex was coagulated by freeze-thawing at −15° C., filtrated by a glass-filter and dried to give core-shell polymer R.

TABLE 1

| | | | | | Example No. | | | | | | | |
|---|---|---|---|---|---|---|---|---|---|---|---|---|
| | 1 | 2 | 3 | 4 | 5 | 6 | 7 | 8 | 9 | 10 | REF 1 | REF 2 |
| core-shell polymer | A | B | C | D | E | F | G* | H* | I* | J* | K | L |
| (weight ratio) | | | | | | | | | | | | |
| core (rubbery polymer) | 77 | 70 | 79 | 80 | 60 | 77 | 85 | 85 | 85 | 80 | 85 | 85 |
| core (middle layer) | 14 | 15 | 6 | 8 | 20 | 14 | | | | | | |
| shell | 9 | 15 | 15 | 12 | 20 | 9 | 15 | 15 | 15 | 20 | 15 | 15 |
| CORE rubbery polymer composition (weight ratio) | | | | | | | | | | | | |
| BA | 99.6 | 99.6 | 99.8 | 99.6 | 50.0 | | 96.1 | 96.3 | 89.6 | | 99.8 | 99.6 |
| BGA | 0.2 | 0.2 | 0.2 | 0.2 | | | 0.2 | 0.2 | 0.2 | | 0.2 | 0.2 |
| AIMA | 0.2 | 0.2 | | 0.2 | 0.2 | | 0.2 | | 0.2 | | | 0.2 |
| 2EHA | | | | | 49.5 | | | | | | | |
| HGA | | | | | 0.3 | | | | | | | |
| Bd | | | | | | 75 | | | | 70 | | |
| St | | | | | | 25 | | | | 20 | | |
| GMA | | | | | | | 3.5 | 3.5 | 10.0 | 10 | | |
| rubbery polymer Tg (°C.) | −39 | −39 | −39 | −39 | −47 | −43 | −38 | −39 | −34 | −40 | −39 | −39 |
| composition of middle layer (weight ratio) | | | | | | | | | | | | |
| MMA | 70 | | | 49.8 | | 70 | | | | | | |

TABLE 1-continued

| | Example No. | | | | | | | | | | | |
|---|---|---|---|---|---|---|---|---|---|---|---|---|
| | 1 | 2 | 3 | 4 | 5 | 6 | 7 | 8 | 9 | 10 | REF 1 | REF 2 |
| GMA | 20 | 20 | 50.0 | 40.0 | 20.0 | 20 | | | | | | |
| EA | 10 | | | 10.0 | | 10 | | | | | | |
| BA | | 79.6 | 49.9 | | 79.5 | | | | | | | |
| BGA | | 0.2 | 0.1 | 0.1 | | | | | | | | |
| AIMA | | 0.2 | | | 0.2 | | | | | | | |
| AIMI | | | | 0.1 | | | | | | | | |
| HGA | | | | | 0.3 | | | | | | | |
| SHELL composition (weight ratio) | | | | | | | | | | | | |
| MMA | 100 | 90 | 90 | 90 | 89.8 | 100 | 90 | 90 | 90 | 90 | 70 | 90 |
| EA | | 10 | 10 | 10 | 10.0 | | 10 | 10 | 10 | 10 | 10 | 10 |
| BGA | | | | | 0.2 | | | | | | | |
| GMA | | | | | | | | | | | 20 | |
| shell Tg (°C.) | 129 | 113 | 113 | 113 | 113 | 129 | 113 | 114 | 113 | 114 | 110 | 113 |

Note)*; at start of GMA feeding
G: from when 80% of total core weight has been fed
H: from when 95% of total core weight has been fed
I: from start of feeding
J: from start of feeding

TABLE 2

| | Example No. | | | | | | | | | | | | |
|---|---|---|---|---|---|---|---|---|---|---|---|---|---|
| | 11 | 12 | 13 | 14 | 15 | 16 | 17 | 18 | 19 | 20 | REF 3 | REF 4 | |
| | | | | | | | PBT Resin composition | | | | | | |
| | (1) | (2) | (3) | (4) | (5) | (6) | (7) | (8) | (9) | (10) | (11) | (12) | |
| Core-shell polymer | A | B | C | D | E | F | G | H | I | J | K | L | PBT* |
| notched Izod impact strength (kgf cm/cm) | | | | | | | | | | | | | |
| 30° C. | 56.7 | 80.5 | 74.5 | 81.1 | 82.4 | 58.3 | 80.5 | 78.5 | 74.5 | 81.1 | 17.4 | 81.0 | 5.8 |
| 20° C. | 53.1 | 77.6 | 71.8 | 76.3 | 78.0 | 55.5 | 76.2 | 71.6 | 69.8 | 76.3 | 12.8 | 22.9 | 5.7 |
| 10° C. | 45.4 | 73.7 | 67.1 | 72.7 | 72.8 | 50.4 | 73.8 | 68.7 | 59.1 | 72.7 | 13.1 | 18.6 | 5.5 |
| 0° C. | 20.7 | 27.0 | 30.6 | 31.1 | 30.3 | 24.8 | 24.1 | 28.0 | 23.6 | 23.1 | 12.2 | 17.1 | 5.1 |
| −10° C. | 20.5 | 25.9 | 27.0 | 27.8 | 26.9 | 22.0 | 22.5 | 24.9 | 21.0 | 20.8 | 9.8 | 14.6 | 5.1 |
| −30° C. | 20.4 | 24.3 | 25.7 | 26.1 | 24.8 | 21.5 | 20.4 | 21.3 | 20.0 | 19.1 | 8.5 | 13.3 | 4.9 |

Note)*; PBT1401 × 04 manufactured by Toray Co., LTD.

TABLE 3

| | Example No. | | | | |
|---|---|---|---|---|---|
| | 21 | 22 | 23 | 24 | 25 |
| core-shell polymer | M | N | O | P | Q |
| (weight ratio) | 82 | 84 | 82 | 80 | 84 |
| core (rubbery polymer) | | | | | |
| core (middle layer) | 3 | 1 | 3 | | 1 |
| shell | 15 | 15 | 15 | 20 | 15 |
| CORE rubbery polymer composition (weight ratio) | | | | | |
| BA | 99.6 | 99.6 | | | 99.6 |
| BGA | 0.2 | 0.2 | 0.2 | | 0.2 |
| AIMA | 0.2 | 0.2 | 0.2 | | 0.2 |
| 2EHA | | | 99.6 | | |
| Bd | | | | 70 | |
| St | | | | 20 | |
| GMA | | | | 10 | |
| rubbery polymer Tg (°C.) | −39 | −39 | −65 | −40 | −39 |
| composition of middle layer (weight ratio) | | | | | |
| GMA | 100 | 100 | 100 | | 100 |
| SHELL composition (weight ratio) | | | | | |
| MMA | 90 | 90 | 90 | 90 | 90 |
| EA | 10 | 10 | 10 | 10 | 10 |
| shell Tg (°C.) | 113 | 113 | 113 | 113 | 113 |

TABLE 4

| | Example No. | | | | | | | | |
|---|---|---|---|---|---|---|---|---|---|
| | 26 | 27 | 28 | 29 | 30 | 31 | 32 | REF 5 | REF 6 |
| | | | | | | | PBT resin composition | | |
| | (13) | (14) | (15) | (16) | (17) | (18) | (19) | (20) | (21) |
| Core-shell polymer | M | N | O | P | Q | M | M | L | L |
| notched Izod impact strength (kgf cm/cm) | | | | | | | | | |
| 30° C. | 81.1 | 78.2 | 82.2 | 77.2 | 80.2 | 72.2 | 61.2 | 18.1 | 14.5 |
| 20° C. | 79.2 | 74.5 | 81.4 | 73.5 | 76.0 | 70.1 | 46.3 | 12.0 | 10.2 |
| 10° C. | 79.1 | 73.9 | 81.2 | 72.1 | 71.5 | 66.6 | 18.2 | 10.7 | 9.3 |
| 0° C. | 71.3 | 72.3 | 78.8 | 70.5 | 27.1 | 51.3 | 16.8 | 9.1 | 8.2 |
| −10° C. | 23.4 | 69.2 | 76.3 | 70.1 | 21.3 | 21.5 | 13.5 | 8.3 | 7.8 |

TABLE 4-continued

| Core-shell polymer | Example No. | | | | | | | | |
|---|---|---|---|---|---|---|---|---|---|
| | 26 | 27 | 28 | 29 | 30 | 31 | 32 | REF 5 | REF 6 |
| | PBT resin composition | | | | | | | | |
| | (13) M | (14) N | (15) O | (16) P | (17) Q | (18) M | (19) M | (20) L | (21) L |
| −30° C. | 14.4 | 20.1 | 18.2 | 19.8 | 20.5 | 14.2 | 12.7 | 6.2 | 5.3 |

What we claim is:

1. A core-shell polymer which comprises
   (a) a core having a rubbery polymer phase obtained by polymerizing an alkyl acrylate wherein the alkyl group has 2 to 8 carbon atoms or a mixture of such alkyl acrylates with a crosslinking monomer and/or a graft monomer, said rubbery polymer phase being covered with an outer phase containing epoxy groups and obtained by polymerizing a vinyl monomer containing an epoxy group or copolymerizing said vinyl monomer containing an epoxy group with an alkyl acrylate or alkyl methacrylate wherein the alkyl is of 2 to 4 carbon atoms, and
   (b) a shell on the core, composed of a polymer having neither epoxy groups nor functional groups that are reactive with epoxy groups, and obtained by polymerizing a vinyl monomer, wherein said core-shell polymer comprises 80 to 95 weight % of said core, per total amount of monomers of the core-shell polymer, and 5 to 20 weight % of said shell, per total amount of monomers of the core-shell polymer, said core comprising 0.1 to 40 weight % of monomers containing an epoxy group per total amount of monomers of the core, and wherein the glass transition temperature of the shell is 40° C. or higher and the glass transition temperature of the rubbery polymer is −30° C. or lower.

* * * * *